US009491594B2

(12) United States Patent
Yang (10) Patent No.: US 9,491,594 B2
(45) Date of Patent: Nov. 8, 2016

(54) METHOD AND SYSTEM FOR MANAGING TERMINAL GROUP

(75) Inventor: Kun Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 64 days.

(21) Appl. No.: 14/234,466

(22) PCT Filed: Feb. 23, 2012

(86) PCT No.: PCT/CN2012/071490
§ 371 (c)(1),
(2), (4) Date: Jan. 23, 2014

(87) PCT Pub. No.: WO2013/097332
PCT Pub. Date: Jul. 4, 2013

(65) Prior Publication Data
US 2014/0307647 A1  Oct. 16, 2014

(30) Foreign Application Priority Data
Dec. 31, 2011 (CN) .......................... 2011 1 0459015

(51) Int. Cl.
*H04H 20/71* (2008.01)
*H04W 4/08* (2009.01)
*H04W 8/18* (2009.01)
(Continued)

(52) U.S. Cl.
CPC .............. *H04W 4/08* (2013.01); *H04W 4/005* (2013.01); *H04W 8/186* (2013.01); *H04W 88/18* (2013.01)

(58) Field of Classification Search
USPC ................................ 370/236, 254, 312, 328
See application file for complete search history.

(56) References Cited

U.S. PATENT DOCUMENTS

| 5,511,232 A * | 4/1996 | O'Dea .................. H04W 84/08 455/519 |
| 7,079,495 B1 * | 7/2006 | Pearce ................ H04L 12/1818 340/3.52 |
| 2011/0280254 A1 * | 11/2011 | Shi .......................... H04W 8/02 370/401 |

(Continued)

FOREIGN PATENT DOCUMENTS

| CN | 101511076 A | 8/2009 |
| CN | 101577964 A | 11/2009 |

(Continued)

OTHER PUBLICATIONS

International Search Report for PCT/CN2012/071490 dated Sep. 19, 2012.

(Continued)

*Primary Examiner* — Kwang B Yao
*Assistant Examiner* — Nguyen Ngo
(74) *Attorney, Agent, or Firm* — Ling Wu; Stephen Yang; Ling and Yang Intellectual Property (57) ABSTRACT

The present document provides a method for managing a terminal group, including: a home subscriber information unit sending group information of a terminal group to a machine type communication interworking function (MTC IWF), and the MTC IWF storing the group information; after receiving request message of the terminal group sent by a server, the MTC IWF executing a terminal group process relevant to the request according to the group information. The present document further provides a system for managing a terminal group. The present document can realize managing a terminal group through an MTC IWF.

14 Claims, 4 Drawing Sheets

(51) Int. Cl.
*H04W 4/00* (2009.01)
*H04W 88/18* (2009.01)

(56) References Cited

U.S. PATENT DOCUMENTS

| | | | | |
|---|---|---|---|---|
| 2013/0115983 A1* | 5/2013 | Ronneke | H04L 51/38 | 455/466 |
| 2013/0115993 A1* | 5/2013 | Jain | H04W 4/005 | 455/517 |
| 2013/0148492 A1* | 6/2013 | Liao | H04W 4/005 | 370/218 |
| 2013/0155948 A1* | 6/2013 | Pinheiro | H04W 4/005 | 370/328 |
| 2013/0155954 A1* | 6/2013 | Wang | H04W 4/005 | 370/328 |
| 2013/0279372 A1* | 10/2013 | Jain | H04W 4/06 | 370/254 |
| 2014/0161086 A1* | 6/2014 | Tamura | H04W 72/14 | 370/329 |
| 2014/0219182 A1* | 8/2014 | Chandramouli | H04W 4/005 | 370/328 |
| 2014/0286237 A1* | 9/2014 | Bhalla | H04W 4/005 | 370/328 |
| 2015/0256959 A1* | 9/2015 | Jain | H04W 56/00 | 370/312 |

FOREIGN PATENT DOCUMENTS

| | | |
|---|---|---|
| CN | 101931859 A | 12/2010 |
| CN | 102202270 A | 9/2011 |

OTHER PUBLICATIONS

Technical Specification Group Services and System Aspects; System Improvements for Machine-Type Communication; 3rd Generation Partnership Project; 3GPP TR 23.888 V1.6.0(Nov. 2011); XP50575133A1.

Technical Specification Group Services and System Aspects; Service requirements for Machine-Type Communication; 3rd Generation Partnership Project; 3GPP TS 22.368 V11.3.0 (Sep. 2011); (MTC) ; XP50554259A1.

* cited by examiner

METHOD AND SYSTEM FOR MANAGING TERMINAL GROUP

TECHNICAL FIELD

The present document relates to managing a machine type communication (MTC) terminal, and in particular, to a method and system for managing a terminal group.

BACKGROUND OF THE RELATED ART

Figure 1:
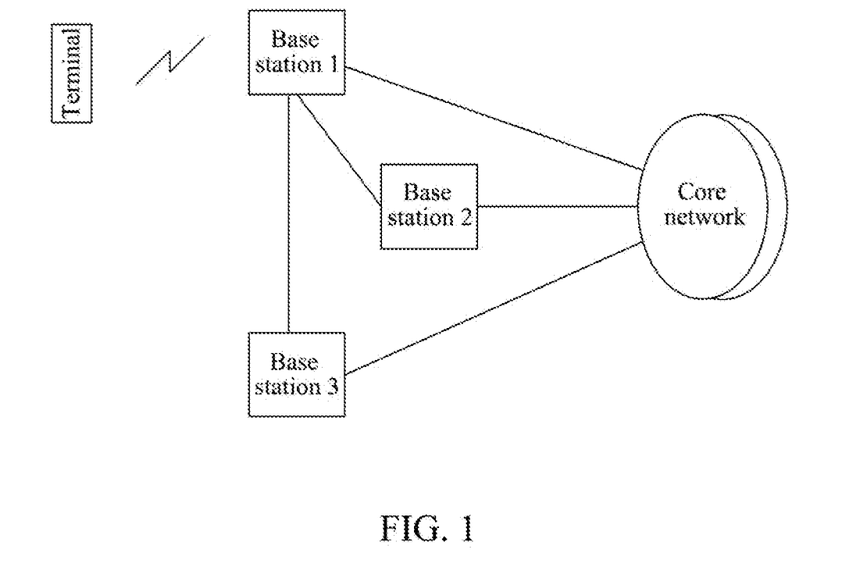
FIG. 1 is a structure diagram of a traditional cellular wireless communication system.

FIG. 1 is a structure diagram of a traditional cellular wireless communication system; as shown in FIG. 1, the cellular wireless communication system is mainly composed of a core network (CN), a radio access network (RAN) and terminals. Wherein, the CN is responsible for the non-access stratum service, for example: terminal location updating, etc., and the CN is the anchor point of the user plane. The RAN includes: a base station, or a base station and base station control; the RAN is responsible for the access stratum service, for example: wireless resources management, etc.; there can exist physical or logical connections among the base stations according to the actual conditions, such as the connection between the base station 1 and the base station 2 and the connection between the base station 1 and the base station 3 as shown in FIG. 1; and each base station can be connected with more than one CN nodes. The terminal, that is, the user equipment (UE), refers to various devices which can communicate with the cellular wireless communication network, for example: a mobile telephone or a notebook computer, etc.

The MTC service refers to: the service for communicating by machines between machines. In the MTC service, with no need of people's participation, all communications are finished by the machine autonomously, which obtains the data through the perception device such as a sensor, etc., and then reports the data to the mobile communication network through a communication module, and accesses to the public data network through the mobile communication network. The MTC service can include: logistics monitoring, safety monitoring, telemedicine detection, and the applications such as remote meter reading etc. The data of the MTC service are managed by a particular server of the mobile operator or a specialized MTC operator, which are available for checking by the MTC user or the MTC administrator. In this process, the device obtaining the data required by the service is a terminal.

The MTC service has introduced the characteristics different from the traditional mobile communication, such as the MTC characteristic based on the group. When the MTC characteristic based on the group is activated, the network can control, manage or charge the MTC terminal grouping according to the demand of the operator. Like that, the MTC characteristic based on the group provides a simple and easy mode in which the group is regarded as a granularity to control/update/charge the MTC terminal, and reduces the surplus signaling to avoid causing the network congestion. When the quantity of the MTC terminal is very large, it can also save the network resources by using the MTC characteristic based on the group. Every terminal within a group can be in the same area, and/or have the same MTC characteristics attribute, and/or belong to the same MTC user; for the network, every terminal in the group is visible.

As to the MTC characteristic based on the group, when the MTC user subscribes a terminal group, the operator need to set and activate the group characteristic in the subscription information of every terminal in the group, and stores the subscription information of every terminal after setting in a home subscriber information unit. The home subscriber information unit includes a Home Subscriber Server (HSS) or a Home Location Register (HLR), which is an entity responsible for storing the identity information, the authentication information and the authorization information of the terminal device, etc., in the core network. According to different situations, the HSS or the HLR can be used for storing the user identity information and the binding information of the user and the terminal device, or only for storing the user identity information (the binding information of the user and the terminal device can be stored by the gateway), or for storing the identity information of the terminal device directly. The HSS or the HLR is further responsible for the subscription database of the user, and executing the identity authentication and authorization of the user, etc. the service platform can inquire the user or terminal information from the HSS or the HLR.

Figure 2:
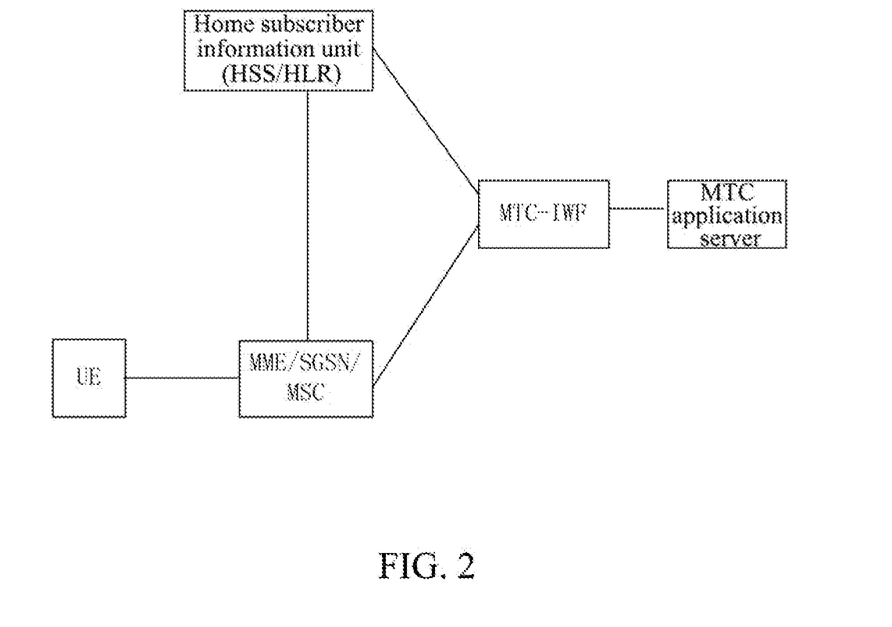
FIG. 2 is a framework diagram of a MTC communication system.

As shown in FIG. 2, it is a framework diagram of a MTC communication system. When the terminal is attached to the network, the mobility management unit obtains the subscription information of that terminal from the HSS or the HLR, and stores the information locally. The mobility management unit includes a mobility management entity (MME) or a serving GPRS supporting node (SGSN) or a Mobile Switching Center (MSC), which is a unit that is responsible for managing the terminal access control, location information updating and switching in the core network, and is responsible for the function of controlling the non-access stratum signaling from the core network to the terminal and registering the terminal to the network.

The machine type communication interworking function (MTC IWF) is a connection entity between a mobile communication network and an external public network, which can realize functions such as protocol conversion, address inquiry, information storage, etc. The interworking function entity is connected to an MTC application server externally, and may be connected to the HSS/HLR or the MME/SGSN/MSC internally.

Usually in some processes, for example, the server needs to trigger the terminal to establish the connection with the server through the MTC IWF, or the MTC IWF needs to obtain the terminal accessibility of the terminal, then the MTC IWF needs to obtain the service node information of the terminal from the HSS or the HLR, or obtain the terminal accessibility information of the terminal from the HSS or the HLR. The service node information is the address of the service MME or SGSN or MSC of the terminal. Now aiming at the MTC characteristic based on the group, such as, dividing the MTC terminals into groups to perform controlling/updating/charging, there is already a solution which selects a terminal group representative MME and a terminal group representative S-GW according to the group information, and controls the terminal group accessibility process and the periodic location updating of the terminal group, etc., according to the group information.

However, after introducing the MTC characteristic based on the group, the function of the existing network is unable to manage the terminal group through the MTC IWF according to the group information, thus avoiding the network congestion caused by that the server or the MTC IWF needs to obtain service node information or terminal accessibility information of a large number of MTC terminals of the terminal group from the HSS or the HLR at the same time.

SUMMARY OF THE INVENTION

The technical problem required to be solved by the present document is to provide a method and system for managing a terminal group, which enable the network to manage the terminal group through the MTC IWF according to the group information.

In order to solve the above-mentioned technical problem, the present document provides a method for managing a terminal group, comprising:

a home subscriber information unit sending group information of a terminal group to a machine type communication interworking function (MTC IWF), and the MTC IWF storing the group information; and after receiving request message of the terminal group sent by a server, the MTC IWF executing a terminal group process relevant to the request message according to the group information.

The above-mentioned method further can have the following characteristics that, the group information comprises:

a group identity, a group representative terminal identity and a group representative service node identity; or, a group identity, a group representative terminal identity and a terminal group accessibility indication; or, a group identity, a group representative terminal identity, a group representative service node identity and a terminal group accessibility indication.

The above-mentioned method further can have the following characteristics that, the home subscriber information unit is a home subscriber server (HSS) or a home location register (HLR); and the group representative service node identity is an identity of a mobility management unit, a service gateway (S-GW) or a packet data network gateway (P-GW).

The above-mentioned method further can have the following characteristics that, the request message is: a terminal group trigger request or a terminal group accessibility request.

The above-mentioned method further can have the following characteristics that, when the request message is a terminal group trigger request, the step of executing a terminal group process relevant to the request message according to the group information comprises:

after receiving the trigger request, the MTC IWF obtaining a terminal group identity or a terminal identity collection in the trigger request, searching for an address of a group representative mobility management unit corresponding to the terminal group according to the group information, constructing new trigger message, and sending the trigger message to the group representative mobility management unit which is searched out.

The above-mentioned method further can have the following characteristics that, when the request message is a terminal group accessibility request, the step of executing a terminal group process relevant to the request message according to the group information comprises:

after receiving the accessibility request, the MTC IWF obtaining a terminal group identity or a terminal identity collection in the accessibility request, searching for an accessibility indication corresponding to the terminal group according to the group information and returning a searching result to the server.

The above-mentioned method further can have the following characteristics that, the method further comprises: the home subscriber information unit notifying the MTC IWF to update the group information after detecting that the group information is changed.

The present document further provides a system for managing a terminal group, comprising a home subscriber information unit and a machine type communication interworking function (MTC IWF), wherein, the home subscriber information unit is configured to send group information of a terminal group to the machine type communication interworking function (MTC IWF), and the MTC IWF is configured to store the group information, and after receiving request message of the terminal group sent by a server, execute a terminal group process relevant to the request message according to the group information.

The above-mentioned system further can have the following characteristics that, the group information comprises:

a group identity, a group representative terminal identity and a group representative service node identity; or, a group identity, a group representative terminal identity and a terminal group accessibility indication; or, a group identity, a group representative terminal identity, a group representative service node identity and a terminal group accessibility indication.

The above-mentioned system further can have the following characteristics that, the home subscriber information unit is a home subscriber server (HSS) or a home location register (HLR); and the group representative service node identity is an identity of a mobility management unit, a service gateway (S-GW) or a packet data network gateway (P-GW).

The above-mentioned system further can have the following characteristics that, the request message is: a terminal group trigger request or a terminal group accessibility request.

The above-mentioned system further can have the following characteristics that, the MTC IWF is configured to execute the terminal group process relevant to the request message according to the group information by means of: when the request message is a terminal group trigger request and after receiving the trigger request, obtaining a terminal group identity or a terminal identity collection in the trigger request, searching for an address of a group representative mobility management unit corresponding to the terminal group according to the group information, constructing new trigger message, and sending the trigger message to the group representative mobility management unit which is searched out.

The above-mentioned system further can have the following characteristics that, the MTC IWF is configured to execute the terminal group process relevant to the request message according to the group information by means of: when the request message is a terminal group accessibility request and after receiving the accessibility request, obtaining a terminal group identity or a terminal identity collection in the accessibility request, searching for an accessibility indication corresponding to the terminal group according to the group information and returning a searching result to the server.

The above-mentioned system further can have the following characteristics that, the home subscriber information unit is further configured to notify the MTC IWF to update the group information after detecting that the group information is changed.

The present document provides a method and system for managing the terminal group, which enable the network to manage the terminal group through the MTC IWF according to the group information.

PREFERRED EMBODIMENTS OF THE INVENTION

The embodiments of the present document are described in detail with reference to the accompanying drawings hereinafter. It should be illustrated that, in the case of not conflicting, the embodiments in the present application and features in these embodiments can be combined with each other.

The embodiments of the present document provide a method for managing a terminal group, including:

a home subscriber information unit sending group information of a terminal group to a machine type communication interworking function (MTC IWF), and the MTC IWF storing the group information; and after receiving request message of the terminal group sent by a server, the MTC IWF executing a terminal group process relevant to the request message according to the group information.

Wherein, a terminal group identity is regarded as subscription data of the terminal and stored in a home subscriber server (HSS) or a home location register (HLR) by the operator;

wherein, the home subscriber information unit can be the HSS or the HLR;

wherein, the home subscriber information unit sends the group information of the terminal group to the MTC IWF through group management message.

Wherein, the group information includes: a group identity, a group representative terminal identity and a group representative service node identity; or, a group identity, a group representative terminal identity and a terminal group accessibility indication; or, a group identity, a group representative terminal identity, a group representative service node identity and a terminal group accessibility indication.

The home subscriber information unit is a home subscriber server (HSS) or a home location register (HLR); and the group representative service node identity is an identity of a mobility management unit, a service gateway (S-GW) or a packet data network gateway (P-GW).

Wherein, the request message includes a terminal group identity or a terminal identity collection. The terminal identity collection is a set of the terminal identities, including one or more terminal identities.

Wherein, the request message can be: a terminal group trigger request or a terminal group accessibility request, etc.

Wherein, the process can be a terminal group trigger process, a terminal group accessibility process, etc.

Wherein, when the request message is a terminal group trigger request, executing a terminal group process relevant to the request message according to the group information includes:

after receiving the trigger request, the MTC IWF obtaining a terminal group identity or a terminal identity collection in the trigger request, searching for an address of a group representative mobility management unit corresponding to the terminal group according to the group information, constructing new trigger message, and sending the trigger message to the group representative mobility management unit which is searched out.

When the request message is a terminal group accessibility request, executing a terminal group process relevant to the request message according to the group information includes:

after receiving the accessibility request, the MTC IWF obtaining a terminal group identity or a terminal identity collection in the accessibility request, searching for an accessibility indication corresponding to the terminal group according to the group information and returning a searching result to the server.

Wherein, the method further includes: the home subscriber information unit notifying the MTC IWF to update the group information after detecting that the group information is changed, and the MTC IWF can be notified through the group management message.

Embodiment One

Trigger Request/SGSN

Figure 3:
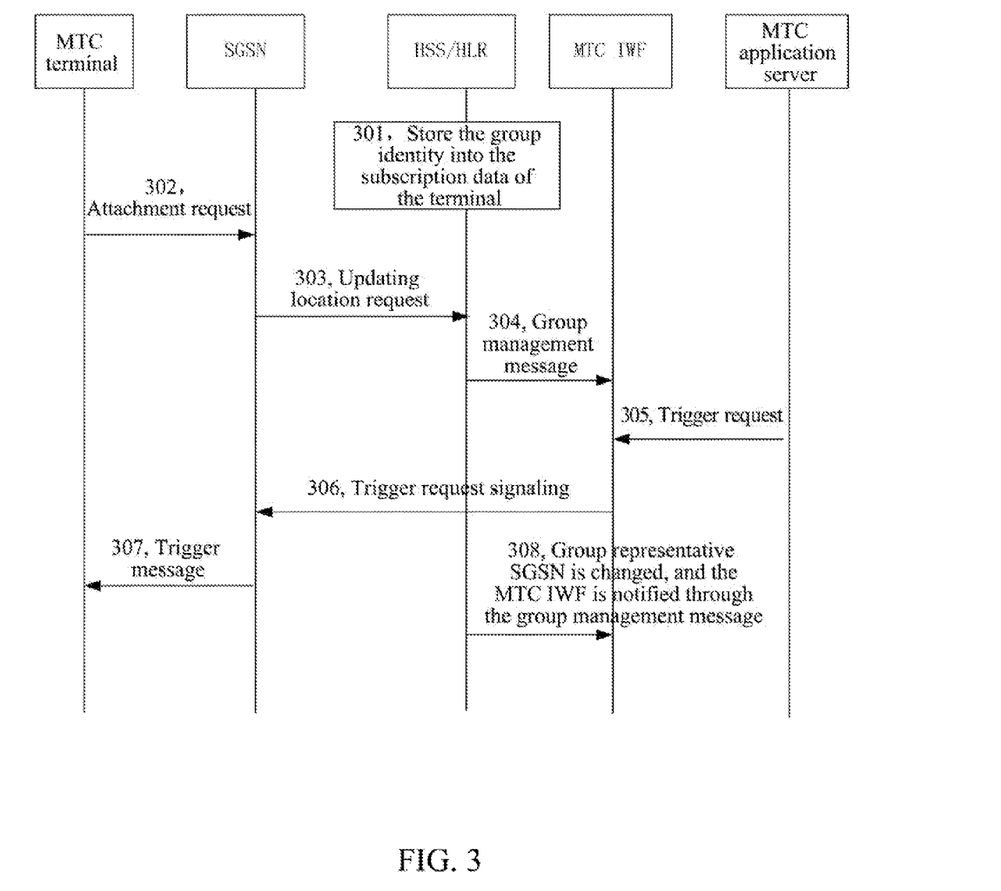
FIG. 3 is a flow chart of embodiment one of the present document.

As shown in FIG. 3 which is simplified, the shown SGSN is a group representative SGSN, wherein the following steps are included:

In step 301, when the terminal accesses the network, a terminal group user subscribes all terminals in the group as the terminals with the group characteristic, and the operator distributes the group identity for that terminal group, which is stored in the HSS or the HLR as the subscription data of the terminal.

In step 302, after the terminal starts, an attachment request is sent to the SGSN, including a terminal identity and a security certificate.

In step 303, the SGSN requests the subscription data of the terminal from the HSS or the HLR through updating location request message after authenticating the terminal identity and the security certificate, and the message includes the terminal identity, such as an international mobile subscriber identity (IMSI).

In step 304, the HSS or the HLR searches for the subscription data corresponding to the terminal in the information stored locally according to the terminal identity after receiving the request of the SGSN, and judges whether the terminal is the group representative terminal of the terminal group:

if the terminal is not the group representative terminal of the terminal group, then the network executes the existing process, that is, the HSS or the HLR provides the subscription data of the terminal for the SGSN through updating location confirmation message, and then the SGSN sends the attachment acceptance message to the terminal, and the message includes the subscription data of the terminal;

if the terminal is the group representative terminal of the terminal group, when the network executes the existing process, the HSS or the HLR regards the service SGSN of the terminal as the group representative SGSN, and sends the group management message through the signaling on the S6m (a reference point by which the MTC IWF queries the HSS/HLR) to provide the group information of the terminal group for the MTC IWF, including the group identity of the terminal, the group representative terminal identity, such as Group Representative UE Identity (GRUEI), and the group representative SGSN identity, such as Group Representative SGSN Identity (GRSGSNI).

It should be illustrated that the group representative terminal can be appointed by the network and also can be set by the MTC user and the operator subscribing.

If the group representative terminal is appointed by the network for the terminal group, the HSS or the HLR can judge whether the current terminal is the group representative terminal by one or a combination of multiple of the following modes:

regarding the first attached terminal in the terminal group as the group representative terminal;

regarding the terminal with optimal performance in the terminal group as the group representative terminal;

regarding the terminal with strongest ability in the terminal group as the group representative terminal.

If the group representative terminal is set by the MTC user and the operator subscribing, then the group identity of the terminal and the set group representative terminal identity are regarded together as the subscription data of the terminal and stored in the HSS or the HLR.

In step 305, when the MTC application server needs to trigger the MTC terminal in the terminal group to establish the connection with the server, the trigger request message is sent to the MTC IWF. The request message includes a terminal group identity or a terminal identity collection, an application identity, an address of the MTC application server, and a valid time of the trigger identity. The terminal group identity or the terminal identity here is an external identity used outside the network.

In step 306, the MTC IWF local database stores a one-to-one mapping table between the external identity and the internal identity. The MTC IWF analyzes the trigger message, reads the terminal group identity or the terminal identity collection in the trigger message, searches for the internal identity, which corresponds to the terminal group identity or the terminal identity and is used in the network in the trigger message, according to the mapping table of the external identity and the internal identity stored in the local database, and searches for the address of the group representative SGSN corresponding to the terminal group according to the group information obtained from the HSS or the HLR and stored in the local database; after finding the address of the group representative SGSN, new trigger message is constructed, and a terminal group or a terminal internal identity is used to replace the external identity of the original trigger message, and sent to the group representative SGSN through the trigger request signaling on the T5a (the reference point between the MTC IWF and the service SGSN).

It needs to illustrated that if the MTC IWF does not obtain the group information corresponding to the terminal group provided by the HSS or the HLR all the time, when the valid time of the trigger indication is expired, the MTC IWF sends the trigger response message to the MTC application server through the signaling on the Tsp (the reference point between the MTC application server and the service MTC IWF), to notify the MTC application server that the trigger request is failed.

In step 307, after receiving the signaling sent by the MTC IWF, the group representative SGSN reads the trigger message contained therein, sets a trigger timer T1 locally, sets the value of the timer T1 locally according to the valid time value in the trigger message, and starts that timer and stores the trigger message of that terminal at the same time.

If the terminal establishes the non-access stratum (NAS) connection with the group representative SGSN, then the SGSN sends the downlink general transmission NAS message to the terminal, and the message includes the trigger message of that terminal;

if the terminal is in an idle state, the group representative SGSN will not transmit the trigger message immediately, while performs the transmission after the terminal establishes the NAS connection with the SGSN.

In step 308, when detecting locally that the service SGSN of the group representative terminal is changed according to the group information, the HSS or the HLR reappoints the group representative SGSN of the terminal group, and notifies the MTC IWF to update its locally stored group information corresponding to the terminal group through the group management message.

Embodiment Two

Trigger Request/MME)

Figure 4:
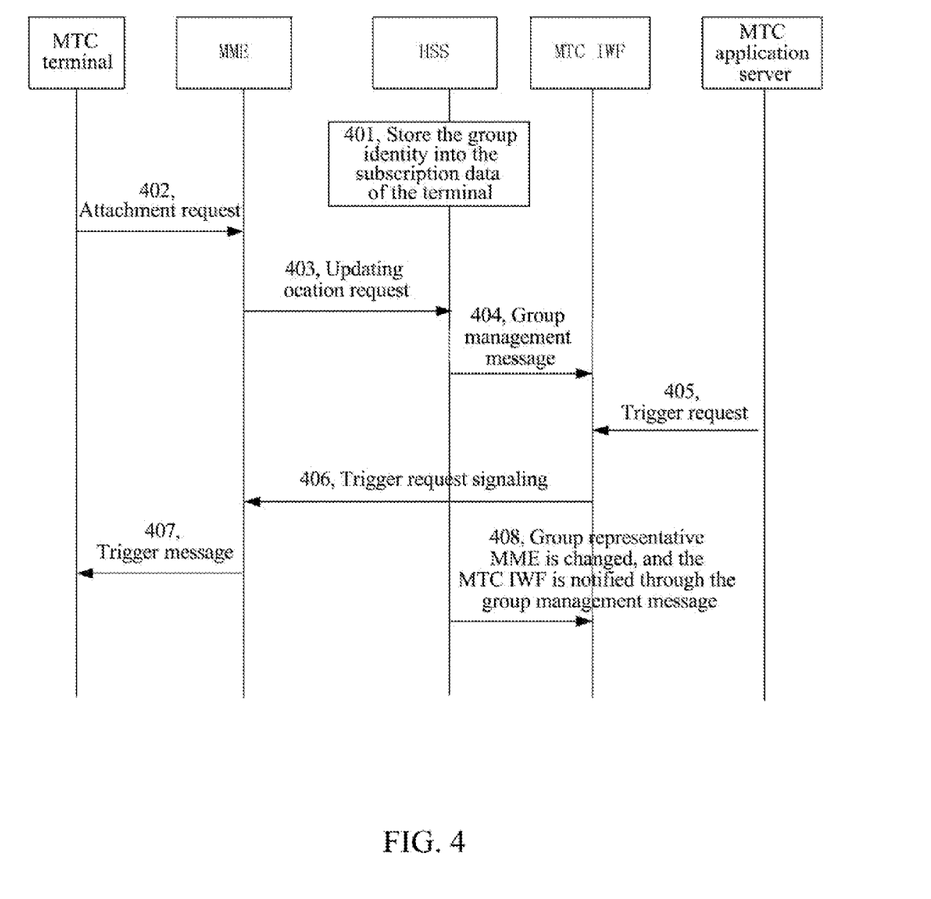
FIG. 4 is a flow chart of embodiment two of the present document.

As shown in FIG. 4, it includes the following steps:

In step 401, when the terminal accesses the network, a terminal group user subscribes all terminals in the group as the terminals with the group characteristic, and the operator distributes the group identity for that terminal group, which is stored in the HSS as the subscription data of the terminal.

In step 402, after the terminal starts, an attachment request is sent to the MME, including a terminal identity and a security certificate.

In step 403, the MME requests the subscription data of the terminal from the HSS through an updating location request message after authenticating the terminal identity and the security certificate, and the message includes the terminal identity, such as an IMSI.

In step 404, the HSS searches for the subscription data corresponding to the terminal in the information stored locally according to the terminal identity after receiving the request of the MME, and judges whether the terminal is the group representative terminal of the terminal group:

if the terminal is not the group representative terminal of the terminal group, then the network executes the existing process, that is, the HSS provides the subscription data of the terminal for the MME through updating location confirmation message, and then the MME sends the attachment acceptation message to the terminal, and the message includes the subscription data of the terminal;

if the terminal is the group representative terminal of the terminal group, when the network executes the existing process, the HSS regards the service MME of the terminal as the group representative MME, and sends the group management message through the signaling on the S6m to provide the group information of the terminal group for the MTC IWF, including the group identity of the terminal, the group representative terminal identity, such as GRUEI, and the group representative MME identity, such as Group Representative MME Identity (GRMMEI).

In step 405, when the MTC application server needs to trigger the MTC terminal in the terminal group to establish the connection with the server, the trigger request message is sent to the MTC IWF. The request message includes a terminal group identity or a terminal identity collection, an application identity, an address of the server, and a valid time of the trigger identity. The terminal group identity or the terminal identity here is an external identity used outside the network.

In step 406, the MTC IWF local database stores a one-to-one mapping table between the external identity and the internal identity. The MTC IWF analyzes the trigger message, reads the terminal group identity or the terminal identity collection in the trigger message, searches for the internal identity, which corresponds to the terminal group identity or the terminal identity and is used in the network in the trigger message, according to the mapping table of the external identity and the internal identity stored in the local database, and searches for the address of the group representative MME corresponding to the terminal group according to the group information obtained from the HSS and stored in the local database; after finding the address of the group representative MME, new trigger message is constructed, and a terminal group or a terminal internal identity is used to replace the external identity of the original trigger message, and sent to the group representative MME through the trigger request signaling on the T5a (the reference point between the MTC IWF and the service MME).

In step 407, after receiving the signaling sent by the MTC IWF, the group representative MME reads the trigger message contained therein, sets a trigger timer T2 locally, sets the value of the timer T2 locally according to the valid time value in the trigger message, and starts that timer and stores the trigger message of that terminal at the same time.

If the terminal establishes the NAS connection with the group representative MME, then the MME sends the downlink general transmission NAS message to the terminal, and the message includes the trigger message of that terminal;

if the terminal is in an idle state, the group representative MME will not transmit the trigger message immediately, while performs the transmission after the terminal establishes the NAS connection with the MME.

In step 408, when detecting locally that the service MME of the group representative terminal is changed according to the group information, the HSS reappoints the group representative MME of the terminal group, and notifies the MTC IWF to update its locally stored group information corresponding to the terminal group through the group management message.

Embodiment Three

Terminal Accessibility Request

Figure 5:
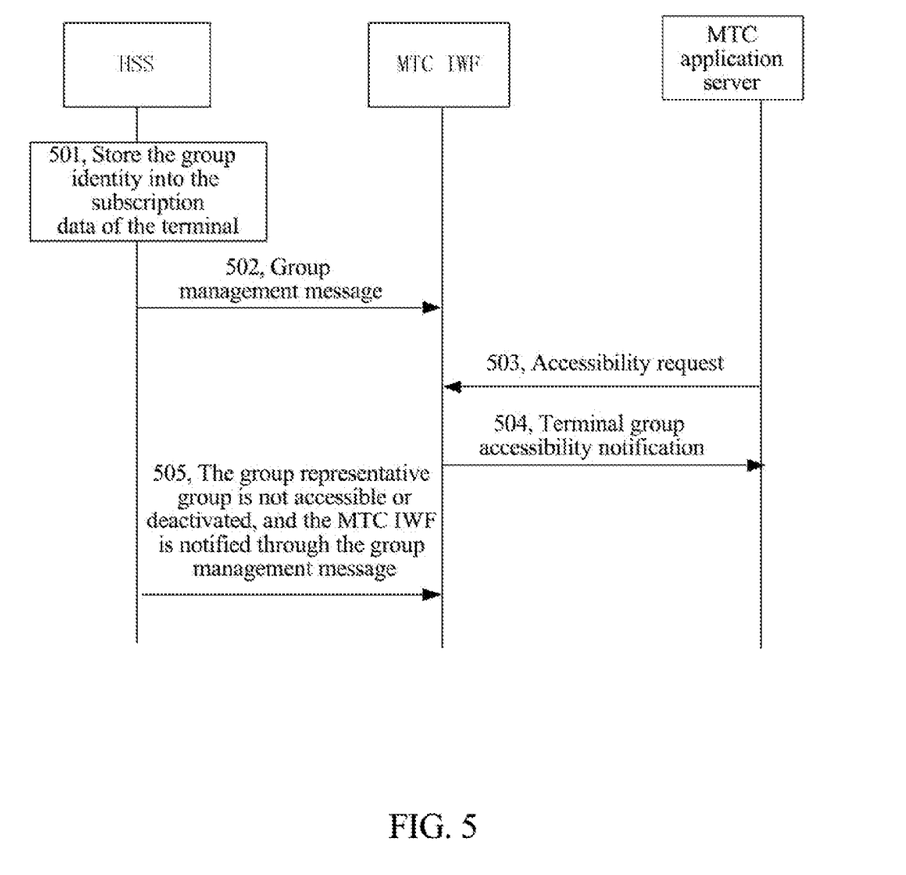
FIG. 5 is a flow chart of embodiment three of the present document.

As shown in FIG. 5, it includes the following steps:

In step 501, when the terminal accesses the network, a terminal group user subscribes all terminals in the group as the terminals with the group characteristic, and the operator distributes the group identity for that terminal group, which is stored in the HSS or the HLR as the subscription data of the terminal.

In step 502, when detecting locally that the group representative terminal is accessible or activated according to the group information, the HSS or the HLR sends the group management message through the signaling on the S6m to provide the group information of the terminal group for the MTC IWF, including the group identity of the terminal, the group representative terminal identity such as GRUEI, and the terminal group accessibility indication.

In step 503, when the MTC application server needs to obtain the terminal accessibility information of the MTC terminal in the terminal group, the terminal group accessibility request message is sent to the MTC IWF. The accessibility request message includes a terminal group identity or a terminal identity collection. The terminal group identity or the terminal identity here is an external identity used outside the network.

In step 504, the MTC IWF local database stores a one-to-one mapping table between the external identity and the internal identity. The MTC IWF analyzes the accessibility request message, reads the terminal group identity or the terminal identity collection in the accessibility request message, searches for the internal identity, which corresponds to the terminal group identity or the terminal identity and is used in the network in the accessibility request message, according to the mapping table of the external identity and the internal identity stored in the local database, and searches for the terminal group accessibility indication corresponding to the terminal group according to the group information obtained from the HSS or the HLR and stored in the local database:

if the MTC IWF finds that the terminal group accessibility indication corresponding to the terminal group is that the terminal group is accessible in the group information stored in the local database, then it sends the terminal group accessibility notification message through the signaling on the Tsp to notify the MTC application server that the terminal group is accessible;

if the MTC IWF finds that the terminal group accessibility indication corresponding to the terminal group is that the terminal group is not accessible in the group information stored in the local database or there is no group information corresponding to the terminal group stored in the local database, then it sends the terminal group accessibility notification message through the signaling on the Tsp to notify the MTC application server that the terminal group is not accessible.

In step 505, when detecting locally that the group representative terminal is not accessible or deactivated according to the group information, the HSS or the HLR resets the accessibility indication of the terminal group, and notifies the MTC IWF to update its locally stored group information corresponding to the terminal group through the group management message.

The embodiments of the present document further provide a system for managing a terminal group, including a home subscriber information unit and a machine type communication interworking function (MTC IWF), wherein, the home subscriber information unit is configured to send group information of a terminal group to the machine type communication interworking function (MTC IWF), and the MTC IWF is configured to store the group information, and after receiving request message of the terminal group sent by a server, execute a terminal group process relevant to the request message according to the group information.

Wherein, the group information includes:

a group identity, a group representative terminal identity and a group representative service node identity; or, a group identity, a group representative terminal identity and a terminal group accessibility indication; or, a group identity, a group representative terminal identity, a group representative service node identity and a terminal group accessibility indication.

Wherein, the home subscriber information unit is a home subscriber server (HSS) or a home location register (HLR); and the group representative service node identity is an identity of a mobility management unit, a service gateway (S-GW) or a packet data network gateway (P-GW).

Wherein, the request message is: a terminal group trigger request or a terminal group accessibility request.

Wherein, the MTC IWF is configured to: when the request message is a terminal group trigger request, after receiving the trigger request, obtain a terminal group identity or a terminal identity collection in the trigger request, search for an address of a group representative mobility management unit corresponding to the terminal group according to the group information, construct new trigger message, and send the trigger message to the group representative mobility management unit which is searched out.

Wherein, the MTC IWF is configured to: when the request message is a terminal group accessibility request, after receiving the accessibility request, obtain a terminal group identity or a terminal identity collection in the accessibility request, search for an accessibility indication corresponding to the terminal group according to the group information and return a searching result to the server.

Wherein, the home subscriber information unit is further configured to notify the MTC IWF to update the group information after detecting that the group information is changed.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limited to any specific form of the combination of the hardware and software.

INDUSTRIAL APPLICABILITY

The above-mentioned method and system for managing the terminal group enable the network to manage the terminal group through the MTC IWF according to the group information.

What I claim is:

1. A method for managing a terminal group, comprising:
    a home subscriber information unit sending group information of a terminal group of MTC terminals to a machine type communication interworking function (MTC IWF), wherein the group information sent by the home subscriber information unit to the MTC IWF comprises an identity of a group representative terminal within the terminal group of MTC terminals, and the MTC IWF storing the group information; and
    after receiving request message of the terminal group sent by a server, the MTC IWF executing a terminal group process relevant to the request message according to the group information which comprises the identity of the group representative terminal;
    wherein, the request message is: a terminal group trigger request or a terminal group accessibility request;
    wherein, when the request message is a terminal group accessibility request, the step of executing a terminal group process relevant to the request message according to the group information comprises:
    after receiving the accessibility request, the MTC IWF obtaining a terminal group identity or a terminal identity collection in the accessibility request, searching for an accessibility indication corresponding to the terminal group according to the group information and returning a searching result to the server.

2. The method according to claim 1, wherein, the group information further comprises:
    a group identity, and a group representative service node identity; or,
    a group identity, and a terminal group accessibility indication; or,
    a group identity, a group representative service node identity and a terminal group accessibility indication.

3. The method according to claim 2, wherein, the home subscriber information unit is a home subscriber server (HSS) or a home location register (HLR); and the group representative service node identity is an identity of a mobility management unit, a service gateway (S-GW) or a packet data network gateway (P-GW).

4. The method according to claim 2, further comprising: the home subscriber information unit notifying the MTC IWF to update the group information after detecting that the group information is changed.

5. The method according to claim 1, wherein, when the request message is a terminal group trigger request, the step of executing a terminal group process relevant to the request message according to the group information comprises:
    after receiving the trigger request, the MTC IWF obtaining a terminal group identity or a terminal identity collection in the trigger request, searching for an address of a group representative mobility management unit corresponding to the terminal group according to the group information, constructing new trigger message, and sending the trigger message to the group representative mobility management unit which is searched out.

6. The method according to claim 5, further comprising: the home subscriber information unit notifying the MTC IWF to update the group information after detecting that the group information is changed.

7. The method according to claim 1, further comprising: the home subscriber information unit notifying the MTC IWF to update the group information after detecting that the group information is changed.

8. A system for managing a terminal group, comprising a home subscriber information unit and a machine type communication interworking function (MTC IWF), wherein,
    the home subscriber information unit is configured to send group information of a terminal group of MTC terminals to the machine type communication interworking function (MTC IWF), wherein the group information sent by the home subscriber information unit to the MTC IWF comprises an identity of a group representative terminal within the terminal group of MTC terminals, and
    the MTC IWF is configured to store the group information, and after receiving request message of the terminal group sent by a server, execute a terminal group process relevant to the request message according to the group information which comprises the identity of the group representative terminal;
    wherein, the request message is: a terminal group trigger request or a terminal group accessibility request;
    wherein the MTC IWF is configured to execute the terminal group process relevant to the request message according to the group information by means of: when the request message is a terminal group accessibility request, after receiving the accessibility request, obtaining a terminal group identity or a terminal identity collection in the accessibility request, searching for an accessibility indication corresponding to the terminal group according to the group information and returning a searching result to the server.

9. The system according to claim 8, wherein, the group information further comprises:
    a group identity, and a group representative service node identity; or,
    a group identity, and a terminal group accessibility indication; or,
    a group identity, a group representative service node identity and a terminal group accessibility indication.

10. The system according to claim 9, wherein, the home subscriber information unit is a home subscriber server (HSS) or a home location register (HLR); and the group representative service node identity is an identity of a mobility management unit, a service gateway (S-GW) or a packet data network gateway (P-GW).

11. The system according to claim 9, wherein, the home subscriber information unit is further configured to notify the MTC IWF to update the group information after detecting that the group information is changed.

12. The system according to claim 8, wherein,
the MTC IWF is configured to execute the terminal group process relevant to the request message according to the group information by means of: when the request message is a terminal group trigger request, after receiving the trigger request, obtaining a terminal group identity or a terminal identity collection in the trigger request, searching for an address of a group representative mobility management unit corresponding to the terminal group according to the group information, constructing new trigger message, and sending the trigger message to the group representative mobility management unit which is searched out.

13. The system according to claim 12, wherein, the home subscriber information unit is further configured to notify the MTC IWF to update the group information after detecting that the group information is changed.

14. The system according to claim 8, wherein, the home subscriber information unit is further configured to notify the MTC IWF to update the group information after detecting that the group information is changed.

* * * * *